United States Patent [19]
Neil et al.

[11] Patent Number: 5,579,333
[45] Date of Patent: Nov. 26, 1996

[54] COOLED LASER MIRROR MATERIALS

[75] Inventors: Jeffrey T. Neil, E. Pepperell; J. Thomas Smith, Acton, both of Mass.

[73] Assignee: United States of America as represented by the Secretary of the Air Force, Washington, D.C.

[21] Appl. No.: 772,492

[22] Filed: Sep. 4, 1985

[51] Int. Cl.⁶ .......................................... C02B 5/08
[52] U.S. Cl. ................. 372/99; 372/36; 372/107; 359/515; 359/845; 501/32
[58] Field of Search .............. 350/609; 372/34–36, 372/99, 107; 501/32, 53; 359/515, 84 T

[56] References Cited

U.S. PATENT DOCUMENTS 4,214,818  7/1980  Choyhe et al. ................ 350/609
4,451,118  5/1984  Staleup et al. ................ 501/32

*Primary Examiner*—Nelson Moskowitz
*Attorney, Agent, or Firm*—Thomas L. Kundert

[57] ABSTRACT

An improved cooled high power laser mirror system is described which uses a silicon mirror face with an attached silicon nitride based heat exchanger assembly. The silicon nitride provides a high strength, high toughness, and stiff backup assembly. The particular silicon nitride system is microstructurally engineered to provide a thermal expansion match to silicon designed to insure high quality bonding and minimum mirror distortion.

3 Claims, 1 Drawing Sheet

COOLED LASER MIRROR MATERIALS

The Government has rights in this invention pursuant to Contract No. F33615-85-C-5013 awarded by the U.S. Air Force.

FIELD OF THE INVENTION

This invention relates to materials for cooled laser mirrors. More particularly, this invention relates to cooled laser mirrors made from a silicon mirror face attached to a silicon nitride based support and cooling structure.

BACKGROUND OF THE INVENTION

The U.S. Government has been interested in light, high performance cooled laser mirror assemblies for many years. The most recent generation has used single crystal silicon as the mirror face. Thermal expansion mismatch questions led to the use of single crystal silicon for the attached heat exchanger assembly as well thus eliminating any problem of residual stresses after bonding. Great strides in mirror technology were made in this effort but questions of system reliability remained. The present invention addresses this critical issue.

SUMMARY OF THE INVENTION

In accordance with the present invention a new and improved cooled laser mirror is provided. The cooled laser mirror comprises a mirror face bonded to a heat exchanger assembly. The mirror face is silicon and the heat exchanger assembly is a silicon nitride matrix which has a particulate phase uniformly dispersed therein. The silicon nitride matrix comprises silicon nitride, yttria, and alumina and the particulate phase is selected from the group consisting of titanium carbide, titanium nitride, titanium carbonitride, and combinations thereof. The heat exchanger assembly is electrically conductive and has a thermal expansion equal to or slightly greater than the mirror face.

Figure 1:
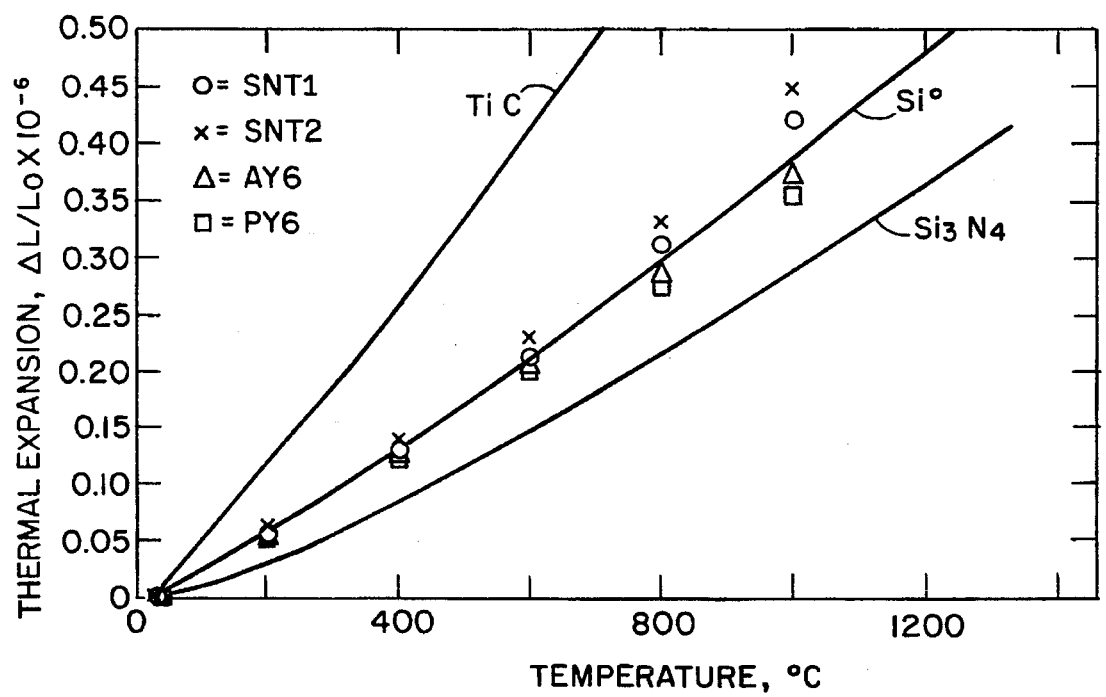
FIG. 1 of the drawing is a curve of thermal expansion data for silicon nitride, silicon, titanium carbide, silicon nitride with 6 w/o $Y_2O_3$ and 2 w/o $Al_2O_3$ designated as AY6, silicon nitride with 6 w/o $Y_2O_3$ designated as PY6, and two silicon nitride-titanium carbide composites (SNT 1, SNT 2). The two silicon nitride-titanium carbide composites are examples of the materials used in accordance with the present invention.

For a better understanding of the present invention, together with other and further objects, advantages and capabilities thereof, reference is made to the following disclosure and appended claims in connection with the above-described drawing.

DETAILED DESCRIPTION OF THE INVENTION

The failures of single crystal silicon systems have occurred during pressurization with coolant. Fracture origins have been traced back to minute surface flaws on the heat exchanger coolant channels. The difficulty in eliminating such flaws has led to a poor,, overall, system reliability. It should be noted that no failures have been traced to the mirror face. The present invention is designed to solve the reliability problem by replacing the single crystal silicon heat exchanger assembly with a stronger, tougher, fine grained polycrystalline ceramic based on silicon nitride. This ceramic material has proven itself in rigorous applications such as gas turbine and diesel engines to possess material properties capable of meeting the requirements for the heat exchanger assembly. In addition silicon nitride has a thermal expansion very close to that of silicon. Using the silicon nitride composite system proposed, the thermal expansion characteristics can be easily adjusted as desired to provide the best reliability in the final system. This composite material incorporates a particulate second phase of titanium carbide, titanium nitride, or titanium carbonitride in the silicon nitride matrix.

The thermal expansion of current commercial silicon nitride ceramics is near but slightly less than that of silicon (AY6 and PY6 in FIG. 1). A lower expansion in the heat exchanger would lead to undesirable tensile stresses in the mirror face. The preferred silicon nitride system proposed in this invention is a particulate dispersed phase composite material with AY6 (silicon nitride with 6 w/o $Y_2O_3$ and 2 w/o $Al_2O_3$) as the matrix and from about 15 v/o to about 30 v/o titanium carbide as the dispersed phase. This material, referred to as AY6-TiC, is a commercially available material marketed as a cutting tool for cast iron. The TiC addition (30 v/o in the cutting tool material) increases the expansion of the composite to a value slightly greater than that of silicon with negligible degradation in strength or fracture toughness. Simple adjustment in the TiC level in the ceramic can be used to arrive at a controlled expansion, at a level relative to silicon calculated by computer modeling, to provide the optimal stress level in the mirror face.

In addition to controllable expansion, the TiC addition to silicon nitride provides an additional benefit. The resultant ceramic is electrically conductive and tests show it can be shaped by electrical discharge machining (EDM) as well as traditional diamond grinding or ultrasonic machining techniques.

Bonding of the mirror face and assembly of the heat exchanger can be accomplished by active metal brazing or glass frit bonding.

The mechanical strength and reliability of the heat exchanger for cooled laser mirrors is a serious problem area in the current small-sized, all silicon systems and therefore represents the limiting step in the development of the overall system. Accordingly, the invention involves a solution to this materials problem, by proposing replacement of silicon in the heat exchanger subsystem by silicon nitride based ceramics. To facilitate a discussion of the rationale for the materials choice, Table I presents a comparison of the mechanical and thermal properties of silicon with silicon nitride based ceramics. The composition AY6 refers to silicon nitride with 6 w/o $Y_2O_3$ and 2 w/o $Al_2O_3$ added as an aid to sintering; AY6-TiC refers to a composite material with 70 volume percent AY6 as the matrix and 30 volume percent TiC as a dispersed particulate.

TABLE I

| Properties of Silicon and Silicon Nitride Materials | | | |
|---|---|---|---|
| Properties | A | B | C |
| Strength-MOR (MPa) | 240 | 700 | 700 |
| IFT* (MPa-$m^{1/2}$) | 0.6 | 4.0 | 4.5 |
| Hardness Knoop (GPa) | 10.0 | 15.0 | 13.4 |
| Density (g/cc) | 2.33 | 3.76 | 3.26 | where A = Silicon
B = $Si_3N_4$: 6 w/o $Y_2O_3$, 2 w/o $Al_2O_3$: 30 v/o TiC

TABLE I-continued

Properties of Silicon and Silicon Nitride Materials

| Properties | A | B | C |
|---|---|---|---|

C = $Si_3N_4$: 6 w/o $Y_2O_3$, 2 w/o $Al_2O_3$.
*Indentation Fracture Toughness [A. G. Evans and E. A. Charles, "Fracture Toughness Determinations by Indentation," J. Am. Ceram. Soc., 59 (8) 371–372 (1976).]

A major problem inherent to the use of silicon for construction of the heat exchanger is loss of reliability engendered by the tendency to brittle failure. This is caused by the low toughness of silicon and the presence of surface flaws due to machining or joining damage. Silicon nitride is among the toughest known ceramic materials. A measure of toughness in ceramics is provided by the critical stress intensity factor, also known as fracture toughness; by this measure, silicon nitride based materials are at least five times tougher than silicon. Fracture toughness measures the resistance of a material to propagation of a pre-existing crack or flaw.

A simple calculation can be used to demonstrate the benefits of replacing the silicon heat exchanger material with silicon nitride based AY6-TiC material. For brittle materials the following formula can be used to calculate the size of critical flaws causing fracture at a given strength ($\sigma$):

$$\sigma = K_{IC} M/(A)^{1/2},$$

where M is a geometric constant dependent on crack location and shape, A is the crack tip radius, and $K_{IC}$ is the fracture toughness. Results of this calculation are shown in Table II for both materials assuming sharp edged elliptical cracks.

TABLE II

Critical Flaw Sizes for Heat Exchanger Materials

| | Critical Flaw Radius (microns) | | |
|---|---|---|---|
| Stress (Kpsi) | A $K_{IC}$ = 0.6 | B $K_{IC}$ = 4.0 | C $K_{IC}$ = 4.5 |
| 10 | 51 | 2250 | 2390 |
| 20 | 13 | 563 | 597 |
| 30 | 6 | 250 | 265 |
| 40 | 3 | 141 | 150 | where A = Silicon
B = $Si_3N_4$: 6 w/o $Y_2O_3$, 2 w/o $Al_2O_3$: 30 v/o TiC
C = $Si_3N_4$: 6 w/o $Y_2O_3$, 2 w/o $Al_2O_3$.

As shown in the table the AY6-TiC materials (B) show a much greater tolerance than silicon for flaws when stressed to a given level. The critical flaw size to cause failure for silicon is such that care in surface preparation such as polishing and etching is critical for survival. The AY6-TiC material obviously does not need this same level of care thereby saving substantial cost in fabrication. This is however offset to a certain degree by the slower machining rate of silicon nitride versus silicon (about ⅓ the rate). Conversely, for a given quality of surface preparation, silicon nitride materials will have far greater strength and reliability.

The selection of the AY6-TiC composite as the material of choice over other forms of silicon nitride requires some explanation. The benefits of the AY6-TiC material are shown below:

its thermal expansion characteristics are easily manipulated;

a large existing commercial manufacturing expertise exists;

there are potential benefits in machinability over monolithic $Si_3N_4$ or silicon.

FIG. 1 and Table III show literature values for the thermal expansion of silicon nitride, silicon metal, and titanium carbide. The literature values were obtained from Thermophysical Properties of Matter Vol. 13, IFI/PLENUM (1977). Also included are measured data for $Si_3N_4$ with 6 w/o $Y_2O_3$, $Si_3N_4$ with 6 w/o $Y_2O_3$ plus 2 w/o $Al_2O_3$ and AY6-TiC compositions. The measured data points are listed in Table III.

TABLE III

THERMAL EXPANSION (L/Lo × $10^{-6}$/°C.)

| MATERIAL | TEMPERATURE | | | | | |
|---|---|---|---|---|---|---|
| | 200° C. | 400° C. | 600° C. | 800° C. | 1000° C. | 1200° C. |
| AY6 | 0.05 | 0.120 | 0.198 | 0.282 | 0.374 | — |
| PY6 | 0.052 | 0.122 | 0.196 | 0.273 | 0.354 | — |
| SNT 1 | 0.056 | 0.130 | 0.215 | 0.312 | 0.421 | — |
| SNT 2 | 0.060 | 0.139 | 0.231 | 0.334 | 0.450 | — |
| TiC | 0.120 | 0.261 | 0.412 | — | — | — |
| Si° | 0.057 | 0.130 | 0.211 | 0.298 | 0.389 | 0.482 |
| $Si_3N_4$ | 0.030 | 0.085 | 0.148 | 0.217 | 0.289 | 0.365 |

As can be seen silicon nitride tends to have slightly lower expansion than desired. The data points labeled AY6 and PY6 show increases in thermal expansion made by the addition of yttria and alumina sintering aids. These expansion values are near silicon but would still tend to put the silicon mirror face in tension on cooling after assembly. AY6-TiC (SNT 1 and SNT 2) data points show an expansion slightly above silicon where the final assembly would have a mirror face in slight compression, a more desirable situation for low toughness brittle materials like silicon. Depending on the level of residual stress required, based on computer modeling, the expansion characteristics can be altered through changes in the amount of particulate TiC used in the composite. AY6-TiC is more desirable than PY6 ($Si_3N_4$ with 6 w/o $Y_2O_3$) for bonding to silicon. Tests made by bonding AY6-TiC and PY6 to CVD silicon showed cracking failure in the PY6 joint and the absence of cracks with AY6-TiC joint. These results confirm AY6-TiC as the material of choice.

The use of AY6-TiC provides an additional benefit of great importance in the long term consideration of supplying a low cost complex shaped heat exchanger. Titanium carbide additions render the resultant composite electrically conducting when added in levels above about 15 volume percent. The $Si_3N_4$ ceramic can therefore be machined by electrical discharge machining (EDM). This machining technique is widely used in metals fabrication to economically produce complicated shapes and contours. The benefits of applying this technology to machining of silicon nitride based ceramics is obvious particularly when the alternatives are slow and expensive ultrasonic machining or diamond grinding.

Preliminary in house studies on applying EDM techniques to AY6-TiC demonstrated that some subsurface damage does occur due to the arc melting/vaporization process. The depth of this damage is about 10 microns and reduces the strength in four point flexure of the EDM processed surface from 100,000 psi to about 70,000 psi. Even at this level the strength of such a material far exceeds that of silicon. However in production the more likely approach would be to do initial machining by EDM followed by an ultrasonic finish cut, thus maintaining the full material strength capability.

Although the discussion has been confined to TiC as the composite dispersed phase for this application other materials could be equally suitable. The basic requirements are a thermal expansion greater than silicon and an ability to form a composite with silicon nitride without a major degradation of the strength and fracture toughness of the matrix. Titanium nitride for example would also be a suitable composite dispersed phase and still maintain the electrical conductivity necessary for EDM fabrication processes.

Attachment of the silicon mirror blank to its substrate and assembly of the heat exchanger unit requires a highly reliable bonding technology The choice of tough, strong silicon nitride based ceramics for the heat exchanger unit and the decision to put the silicon mirror blank slightly into compression at operating temperature is intended to ensure a highly reliable system that can be scaled up to a one meter size without danger of mechanical failure in construction or in service. This necessitates choosing a bonding technology which yields strong, reliable bonds that do not themselves contribute to a brittle failure mechanism. The use of active metal brazing such as Ticusil or Cusil ABA obtained from GTE Wesgo, Belmont, Calif. as the primary joining technology meets these requirements. High reliability braze joints with flexural strengths over 60,000 psi have been made in joining AY6-TiC to AY6-TiC using Ticusil.

Glass frit bonding technology provides an alternative approach to bonding the mirror and heat exchanger assembly. In this case the glass used must have a thermal expansion near that of silicon and generally results in a lower strength bond.

In summary, the current invention describes a method to improve the reliability of current high power cooled laser mirrors through the use of a silicon nitride based heat exchanger bonded to a silicon mirror face. A key to the invention is the utilization of a composite system designed to tailor the thermal expansion of the heat exchanger to providing an optimal stress state in the mirror after bonding. The preferred embodiment of the invention utilizes dispersed TiC or TiN in the silicon nitride matrix. These materials produce a composite of controlled thermal expansion which is also electrically conducting and thus machinable by electrical discharge machining techniques.

While there has been shown and described what is at present considered the preferred embodiment of the invention, it will be obvious to those skilled in the art that various changes and modifications may be made therein without departing from the scope of the invention as defined by the appended claims.

What is claimed is:

1. A cooled laser mirror comprising a mirror face bonded to a heat exchanger assembly, said mirror face being silicon and said heat exchanger assembly being a silicon nitride matrix having a particulate phase uniformly dispersed therein, said silicon nitride matrix comprising silicon nitride, yttria, and alumina; said particulate phase being selected from the group consisting of titanium carbide, titanium nitride, titanium carbonitride, and combination thereof; said heat exchanger assembly being electrically conductive, said heat exchanger assembly having a thermal expansion equal to or slightly greater than said mirror face.

2. A cooled laser mirror in accordance with claim 1 wherein said particulate phase being about 15 to about 30 volume percent of said heat exchanger assembly.

3. A cooled laser mirror in accordance with claim 1 wherein said yttria being about 6 w/o and said alumina being about 2 w/o of said silicon nitride matrix.

* * * * *